3,271,330
HIGH MOLECULAR WEIGHT PHOSPHONITRILE
FLUOROESTERS
Roger L. Evans, Mendota Heights, Minn., assignor to Minnesota Mining and Manufacturing Company, St. Paul, Minn., a corporation of Delaware
No Drawing. Filed Nov. 15, 1963, Ser. No. 323,918
8 Claims. (Cl. 260—2)

This is a continuation-in-part of my copending application S.N. 169,648, filed January 29, 1962, now abandoned.

This invention relates to a new and useful class of vulcanizable high molecular weight polymers of phosphonitrile fluoroesters.

Polyphosphonitrilic halides, i.e. chlorides, bromides, iodides and fluorides have long been of interest. The low molecular weight materials, those containing from about 3 to 7 of the basic $PNX_2$ units (X being halogen) are not of great utility per se since they tend to be weak crystalline solids or unstable oils at ordinary temperatures. These materials have been modified in various ways to improve their properties, e.g. by replacing the halogen atoms thereof by alkyl, aryl and alkoxy groups. The resulting products (usually oily liquids) have, however, formed only tars and blackened hard materials when attempts have been made to further polymerize them. Hard thermosetting resins have also been prepared from the low molecular weight polyphosphonitrilic halides, e.g. by reacting them with polyfunctional compounds (see U.S. 2,866,773) or with terminally unsaturated alcohols to form alkenyl esters and then addition polymerizing through the ethylenically unsaturated groups in the ester groups (see U.S. 2,825,718). In these cases the length of the uninterrupted phosphorous-nitrogen chains of the starting materials have not been extended, the resulting polymers containing alternating blocks of the phosphorous-nitrogen and of carbon chains.

Very high molecular weight polyphosphonitrilic halide rubbers can be produced easily from the low molecular weight polyphosphonitrilic halides by heating the latter in vacuo. These high molecular weight materials would be of great value as inorganic rubbers except that they degrade when exposed to water or moist atmosphere with the result that useful polymeric characteristics are soon completely lost. They have been modified previously by replacing the halogen atoms thereon with alkoxy groups (see U.S. 2,586,312). The polymers which have resulted, however, have not been vulcanizable. Thus, although they could be used as modifiers for other resins (for example as plasticizers), as additives in lubricants, etc., shaped rubber articles could not be prepared from them.

It is therefore an object of the present invention to provide a novel and useful class of vulanizable, moldable, high molecular weight phosphonitrilic polymers which are essentially unaffected by water and moist atmosphere and which can be formed into useful, shaped articles. It is another object of the invention to provide a class of vulcanizable, moldable, high molecular weight phosphonitrilic polymers which are hydrophobic and oleophobic. It is another object of the present invention to provide an efficient process for the preparation of the novel polymers of the invention. Other objects of the invention will become apparent to those skilled in the art from reading the specification which follows.

In accord with the above and other objects of the invention a class of solid, high molecular weight, millable, vulcanizable, plastic, water-stable, moldable, non-distillable, light colored, phosphonitrile polymers which are swelled by ketone solvents and which are insoluble in all common solvents has been discovered. The skeletal chains of these polymers contain recurring units represented by the formula:

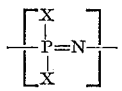

wherein each X is selected from the group consisting of halogen and fluoroalkoxy radicals containing not more than 19 carbon atoms, each, at least 40 percent of the X groups being fluoroalkoxy radicals.

The term "fluoroalkoxy," refers to fluorinated alkoxy radicals of the type:

$$Z(CF_2)_n(CH_2)_mO—$$

where Z is selected from the class consisting of hydrogen, fluorine and $HOCH_2$ (i.e. methylol), $n$ is an integer of at least 1, $m$ is an integer of from 1 through 18 inclusive and $n$ plus $m$ is at least 2 and not more than 19. Ordinarily it is preferred that $n$ be not more than 12 since compounds in which $n$ is greater than 12 are usually more difficult and/or expensive to prepare without compensating improvements in properties.

The fluoroalkoxy groups are named as derivatives of the corresponding alcohols which in turn are considered either as substituted hydrocarbon alcohols or as substituted fluorocarbon alcohols. Thus the alcohol $C_3F_7CH_2OH$ can be named perfluoropropylcarbinol (as a derivative of carbinol, $CH_3OH$) or, alternatively 1,1-dihydroperfluorobutanol. The corresponding fluoroalkoxy group is then named either perfluoropropylcarbinoxy or 1,1-dihydroperfluorobutoxy.

Although all of the polymers of the invention are relatively stable in water or moist atmosphere, it is preferred in polymers of general utility that at least 80 percent of the X groups be fluoroalkoxy. Maximum stability is obtained in the polymers of the invention in which all or substantially of the X groups (i.e. 95 percent or more) are fluoroalkoxy.

The polymers of the invention generally have the following properties:

(1) They can be compounded and vulcanized (crosslinked) using techniques and agents known to the rubber industry, e.g. by such materials as lead oxide (PbO), hexamethylene diamine, etc. This property is of basic importance since it is essential to the preparation of useful, permanently shaped sheets and articles from the polymers.

(2) They can be milled by conventional techniques into coherent sheets.

(3) They are faintly colored or colorless. This is often an important property in certain areas of utility, e.g. in specialty plastics and rubbers since it means that they can be colored as desired. The property of being colorable can even be critical in certain cases for purposes of coding, decoration, etc.

(4) They are highly resistant to corrosive media such as sulfuric, nitric and hydrochloric acids and sodium hydroxide. Except for those polymers in which $n$ is unity they are substantially unaffected by immersion in concentrated sulfuric acid for one hour and then in concentrated sodium hydroxide for one hour at temperatures of from about 100° to 110° C. They can thus be used as gasketing material, liners and sealers in corrosive environments.

(5) They do not sustain combustion and are useful as flame retardants.

(6) They are not distillable when heated.

(7) They are substantially insoluble in water and all common organic solvents including benzene, toluene, xylene, carbon tetrachloride, hexane, acetone, ethyl alcohol, and the like.

(8) They are swelled or plasticized by a number of agents and contracted by others. This swelling and contracting phenomenon appears to be reversible; numerous cycles of swelling and contracting are performed without apparently harming the polymer. They are swelled by water or aqueous solvents or by organic solvents such as acetone. Generally, where Z represents a hydrogen atom, the polymers are more readily swelled by water or similar solvents than when Z represents a fluorine atom.

(9) They are of extremely high molecular weight and hence have useful strength.

The polymers of the invention in which $n$ is 3 or more form a preferred class since they exhibit enhanced stability towards corrosive reagents over those in which $n$ is less than three. Further, when a high degree of hydrophobicity and oleophobicity is also required, it is generally preferred that the value of $n$ be 3 or more and that Z be fluorine, i.e. that the fluoroalkoxy groups terminate in perfluoroalkyl radicals containing at least 3 carbon atoms. When maximum rubbery properties are desired, the fluoroalkoxy radicals should contain from about 3 to 7 carbon atoms. When the fluoroalkoxy radicals contain 8 or more carbon atoms, the polymers assume a more waxy character while still retaining a degree of rubbery properties.

By the term "substantially insoluble" as used in this application is meant that in 100 cc. of selected liquid not more than about 1.0 weight percent of the polymer (dry weight basis) of a 20 gram sample of pure material is dissolved when shaken in the liquid for 20 minutes.

By the term "millable" reference is had to a material which is processable under ordinary atmospheric conditions in conventional equipment used for rubber processing.

By the terms "swelled," "swelling," "swellability," or the like, reference is had to the fact that both the precursor phosphonotrilic halides and the polymers of the invention expand in certain liquid media. This expansion is a characteristic phenomenon which is associated with high polymeric, usually cross-linked materials. The degree of swelling from polymer to polymer can vary greatly; sometimes the swelling is to ten times or more of the original volume.

By the term "nonwater-swellable," reference is had to a polymer of the invention which experiences substantially no expansion when immersed in water for a period of four hours at 20° C.

By "contracted," "contracting," or "contraction," reference is had to the decrease in volume in the swelled polymers of the invention when they are contacted with certain other liquids.

By the term "rubbery" or the like, reference is had to elastic, resilient solids which have an elongation at break greater than about 50 percent (e.g. as measured at a strain rate of 400 percent per minute on an Instron tensile tester).

The term "concentrated" as used herein refers to the conventional concentrated laboratory reagents. Thus, concentrated sulphuric acid is usually about 98 percent by weight. Concentrated sodium hydroxide refers to a solution saturated at room temperature.

The novel polymers of the invention are prepared from high molecular weight polyphosphonitrilic halide rubbers without substantial degradation or scission of the skeletal chains thereof. Since the precursor polymers are insoluble in all common solvents which do not react with them chemically, it is not possible to replace the halogen atoms thereof with the fluoroalkoxy groups using conventional homogeneous reaction systems. It has been found, however, that the halogen atoms on these polymers can be replaced by the heterogenous reaction in which the polymer remains in the solid state dispersed in a solvent system containing an organo-metallic compound carrying the fluoroalkoxy groups which are to replace the halogen from the polymer.

The term "halogen" as used herein refers primarily to fluorine, chlorine and bromine (chlorine being preferred) and denotes the halogen of the polyphosphonotrilic halide rubber precursor which is bonded directly to the phosphorous in the backbone of the polymer. A part of this halogen is sometimes retained in the polymers of the invention.

More specifically, the process of the invention comprises soaking high molecular weight rubbery polyphosphonitrilic halide in a solvent which swells the polymer, dispersing the swelled polymer in an excess of swelling solvent (conveniently using high speed-high shear mixing) into particles ranging from about 10 to 1,000 microns in diameter and reacting the dispersed polymer with an appropriate alkali metal-fluoroalkoxide having the formula:

whereing X is fluoroalkoxy and Y is an alkali metal, e.g. lithium, sodium or potassium.

The polymers of the invention can be prepared free or essentially free of halogen which is bonded directly to the phosphorous in the polymer main chain (i.e. the halogen of the precursor polymer) by the use of a molar excess of the fluoroalkoxide-alkali metal compound. Thus, the replacement of the halogen atoms by the fluoroalkoxide groups tends to continue until essentially all of latter are used up or (if an excess of fluoroalkoxide groups are present) until essentially all of halogen atoms have been replaced. Even when sufficient fluoroalkoxide-alkali metal compound is added to replace all of the halogen atoms from the polymer, however, a small residue of halogen (usually 5% or less based on the halogen present in the starting polymer) may remain due apparently to incomplete contact between the reactants. This amount of halogen, however, has little or no effect on the properties of the product. In some cases, in fact, it is desirable to leave a portion of the halogen atoms in the polymer to provide sites for crosslinking and/or compounding reactions. Only about 40 percent replacement of the halogen in the starting polymer by fluoroalkoxide groups results in a polymer which is usefully stable with respect to water and atmospheric moisture (e.g. retaining useful polymer properties for several weeks while in contact therewith). Replacement of about 80 percent or more of the halogen from the starting polymer results in materials which are amply stable with respect to water and atmospheric moisture for most uses. Replacement of 95 percent or more of the halogen from the starting polymer results in products which are essentially completely stable with respect to water and atmospheric moisture.

The aromatic hydrocarbon solvents such as benzene, toluene, xylene and the like are the preferred swelling solvents for the polyphosphonitrilic halide rubbers since they are easily taken up by and produce a large degree of swelling in the polymers but do not react chemically with them. Chlorinated solvents such as chloroform, carbon tetrachloride, trichloroethylene, 1,1,1-trichloroethane and the like as well as ethers such as anisole, diphenyl ether, etc. can also be used as swelling solvents for the polyphosphonitrilic halides.

The polyphosphonitrilic halide rubber is preferably shredded or otherwise broken up prior to adding the swelling solvent in order to increase the area of contact between the bulk of the rubber and the solvent, thereby speeding the swelling process. Mild heating (below or up to the boiling point of the solvent) also facilitates swelling. Ordinarily, sufficient solvent is added to the polymer to swell it to approximately the maximum degree possible but not a great excess over this amount. The maximum swelling takes a finite length of time to accomplish, e.g. frequently as much as several days. In general, greater degrees of swelling aid in the dispersion of the polymeric precursor and, in fact, a polymer which is insufficiently swelled can often be dispersed properly only with great difficulty.

Once the swelling of the reactant polymer has been accomplished, a considerable excess of the swelling solvent is added and the mixture is subjected to high speed-high shear mixing forces which effectively break up and disperse the polymeric materials in the solvent as semi-gelatinous particles. The final dispersion ordinarily contains less than about 10 percent by weight of polymer and more than 90 percent by weight of solvent. The mixing is continued until the particles have been reduced to a size range of from about 10 to 1,000 microns. This can be accomplished conveniently on a small scale utilizing a high speed kitchen-model blender ordinarily in from about one to thirty minutes. In larger scale operation, chemical process equipment which accomplishes a similar type of mixing action is used. If larger particle sizes than 1,000 microns are utilized, it has been found that sufficient replacement of the halide atoms by the fluoroalkoxy groups generally cannot be achieved. Smaller particle sizes than 10 microns are unnecessary and are relatively difficult to obtain.

The resulting dispersion is then reacted with the alkali metal fluoroalkoxide. For purposes of this invention, the alkoxides are conveniently made in situ by the reaction of the alkali metal with the desired fluoroalcohol in the liquid which is to be used as the medium for the reaction of the alkali metal fluoroalkoxide with the polymer (conveniently the same solvent as that used to swell the polymer).

The reaction between the dispersed polymer and the alkali metal compound is initiated spontaneously upon mixing of the dispersion and the solution. The reaction is preferably carried out in an inert atmosphere, i.e. one which is free of moisture, oxygen and carbon dioxide since these materials tend to react with the reagents. The reaction mixture is preferably agitated during the reaction period which is usually from about 8 to 24 hours although longer or shorter periods may be indicated in some cases. The rate of the reaction is increased by heating, temperatures below the boiling point of the mixture being preferable.

At the end of the reaction period, the agitation is stopped and, if it is desired, the solid product can then be separated from the liquid reaction medium and dried without further treatment. Ordinarily, however, at least most of the non-polymeric starting materials and the by-products of the reaction are removed by several washing cycles. In the first of these, a swelling solvent for the product polymer is ordinarily used. In succeeding washes the swelling solvent can be diluted with greater and greater proportions of a solvent which tends to contract or shrink the swollen polymer or in which a liquid which tends to contract it more strongly replaces a less strongly contracting solvent. It is noted that none of these solvents will contract a polymer to a polymer which contains no solvent. Rather they will all tend to swell it to a greater or lesser degree, the swelling solvents causing the largest amount of swelling of the dry polymer, the contracting solvents the least. The latter will, however, contract a polymer which is saturated with a swelling solvent by replacing the latter. Thus it can be seen that the terms "swelling solvents" and "contracting solvents" are relative. The preferred swelling solvents of the polymers of the invention are the ketones, especially acetone and the contracting solvents include the aromatic hydrocarbons such as benzene, toluene and xylene and water. Water is particularly useful in washing out the water soluble by-products, e.g. the alkali metal halides. At the end of the washing operation, the washing liquid can consist entirely of a contracting solvent although this is not necessary. Variations in this washing cycle are sometimes used. Without some contracting during the washing process, however, the highly swelled gelatinous mass is quite difficult to handle, e.g. enormous quantities of solvent are retained by the polymer making it extremely bulky and difficult to filter due to plugging of the filter bed. On the other hand, if only contracting solvents are used in the washing procedure, impurities may be trapped in the quickly contracted polymer.

The product which remains after the washing-contracting operation is generally a slurry of a finely divided, almost granular solid. Conventional drying techniques can be employed to remove the residual solvents from this material, e.g. evaporation at room temperature and pressure, mild warming at reduced pressure, etc.

The polymers of the invention as produced in the drying operation can be termed "gum stock" and can be converted by milling, vulcanizing and molding into coherent sheets and permanent shaped articles. The milling can be done on a conventional rubber mill. Since the gumstock is thermoplastic, best mixing can usually be achieved when the rolls of the mill are warm. It is, however, sometimes advantageous to cool the rolls before stripping the sheet of milled plastic from them. The plastic material thus obtained is flexible and possesses a characteristic slightly waxy feel. It can then be heat-treated in a cavity mold to give an article of the desired shape or cured in sheet form. A variety of pressures, temperatures and times have been used in this molding operation. Conveniently, temperatures up to 300° F. are used and times from ten minutes to several hours. It is desirable when molding these polymers to use a suitable mold release agent such as a silicone release agent in order to facilitate retrieval of the molded part after a molding operation is completed.

The invention is further illustrated by reference to the following examples. In each example the product is substantially insoluble in water, acetone, benzene, hexane and carbon tetrachloride. On the other hand, it is swelled by water and acetone.

In preparing the polymers of this invention it is convenient to determine the completeness of the replacement of halogen by fluoroalkoxy groups in the original polyphosphonitrilic chloride by analyzing the product polymer for residual halogen. If all of the by-product alkali metal halide is not removed by washing, it is necessary to analyze the product polymer for the alkali metal also. The difference between these two analytical figures (on a molar basis) then gives on the amount of halogen remaining in the polymer, the rest being in the alkali metal halide by-product. The polymer products of the examples below, unless otherwise indicated, have at least about 95 percent of the halogen atoms of the precursor high molecular weight polyphosphonitrilic halides replaced by fluoroalkoxy groups, although some additional halogen may be present in alkali metal halide impurities.

*Example A*

High molecular weight polyphosphonitrilic chloride rubber is prepared by polymerizing low molecular weight polyphosphonitrilic chloride. Conveniently, the trimer or tetramer of phosphonitrilic chloride, or a mixture of the two, is heated in an evacuated, sealed vessel at a temperature of about 300° C. until substantially the whole of the white crystalline material has been converted into a rubbery polymer. If desired, small amounts of low molecular weight polymer which may remain are removed by extraction with a solvent such as benzene.

*Example 1*

Poly $NPCl_2$ rubber (11.6 grams; 0.1 mole), as prepared in Example A above, is swelled to the fullest extent in an excess of benzene. The swelled polymer is subjected to the action of a blender until its particle size is reduced to a diameter between 10 and 1000 microns.

ω,1,1-trihydroperfluorononanol (86.2 grams; 0.2 mole) is dissolved in benzene (ca. 1 liter) and is mixed slowly with a dispersion of sodium (4.6 grams; 0.2 mole) in xylene (ca. 150 ml.). The system is stirred under an inert atmosphere until conversion of the alcohol to the alkoxide is complete. It may be warmed toward the latter stages of the reaction.

The $NPCl_2$ dispersion and the alkoxide suspension (total volume ca. 1.5 liters) are mixed and stirred together under an inert atmosphere at ca. 80° C. for 12 hours. A partially coagulated white solid is obtained, which is washed first with successive aliquots of benzene, secondly with aliquots of water to remove chloride ion. After drying, the new polymer is obtained in the form of light colored resilient tiny beads.

The infrared spectrum of this product is consistent with polydi-(ω,1,1-trihydroperfluorononoxy) phosphonitrile with very few if any chlorine atoms remaining. The product is found to contain 4.8% sodium, 8.8% chlorine and 3.3% phosphorous. This indicates a small amount of sodium chloride impurity and over 95% substitution of the chlorine atoms of the poly $NPCl_2$ rubber by the fluoroalkoxy groups. In a second preparation of the same polymer, the analytical results are 0.61% sodium, 0.36% chlorine and 3.62% phosphorous indicating very little impurity and approximately complete substitution of the chlorine atoms of the poly $NPCl_2$ rubber.

Three portions of this polymeric product are milled in a laboratory rubber mill until coherent sheets have been formed. The first (Lot A) is retained as gum stock, the second (Lot B) is mixed with 10% (of the polymer weight) of lead oxide during milling and the third (Lot C) is mixed with 10% of hexamethylene diamine during milling. Strips for tensile tests are then cut from the milled sheets. Tensile tests are run on an Instron testing machine at a jaw separation rate of 2 inches/minute. The test values obtained correlate with those from ASTM D412–51T. The tensile and elongation values obtained are as follows:

| Lot | Tensile, p.s.i. | Elongation, percent |
|---|---|---|
| A | 171 | 4 |
| B | 358 | 6 |
| C | 420 | 8 |

*Example 2*

Poly $NPCl_2$ rubber (11.6 grams; 0.1 mole), as prepared in Example A above, is dispersed after the manner of Example 1.

ω,1,1-trihydroperfluoropentanol (46.4 grams; 0.2 mole) is converted to its sodium derivative in a manner analogous to that described in Example 1.

The $NPCl_2$ dispersion and the alkoxide suspension are mixed and stirred together under an inert atmosphere at ca. 80° C. for 8 hours. The product, a white precipitate, is washed successively with aliquots of benzene, acetone, and aqueous acetone. (When fully swelled by a swelling solvent, the product assumes a volume of a liter or more.) The polymer is dried slowly in a vacuum oven at a temperature of 60°–80° C. and is recovered as a white resilient solid.

The infrared spectrum of this product is consistent with polydi(ω,1,1-trihydroperfluoropentoxy)phosphonitrile.

Tensile samples of the polymeric product of this example are prepared in the same way as those of Example 1, Lot A being gumstock and Lot B containing 10% hexamethylenediamine. The results are as follows:

| Lot | Tensile, p.s.i. | Elongation, percent |
|---|---|---|
| A | 236 | 64 |
| B | 355 | 10 |

The Gehman $T_{10}$ for this polymer (ASTM D1053–52T) is −65° C. indicating good low temperature properties.

*Example 3*

Poly $NPCl_2$ rubber (11.6 grams; 0.1 mole), as prepared in Example A above, is dispersed after the manner of Example 1.

1,1-dihydroperfluorobutanol (40 grams; 0.2 mole), is converted to its sodium derivative in like manner.

The $NPCl_2$ dispersion and the alkoxide are mixed and stirred together under an inert atmosphere at ca. 80° C. for about 8 hours. The product is a largely coagulated, white solid. It is washed with successive aliquots of benzene, acetone, water (until the washings are free of chloride) and finally acetone to assist in the drying process.

The product is dried at atmospheric or reduced pressure. Drying is accelerated by gentle warming. It is recovered as a resilient powder.

The infrared spectrum of this product is consistent with polydi-(1,1-dihydroperfluorobutoxy) phosphonitrile. The product is found to contain 1.07% sodium and 4.48% chlorine indicating a small amount of residual sodium chloride and approximately 95% substitution of the chlorine in the starting polymer by the fluoroalkoxy groups.

Tensile samples of the polymeric product of this example are prepared in the same way as those of Example 1, Lot A being gumstock and Lot B containing 10% hexamethylenediamine. The results are as follows:

| Lot | Tensile, p.s.i. | Elongation, percent |
|---|---|---|
| A | 222 | 20 |
| B | 354 | 8 |

The Gehman $T_{10}$ for this polymer is −65° C.

*Example 4*

1,1-dihydroperfluoroethanol is used in an analogous manner to that described in the foregoing examples to prepare the corresponding phosphonitrile derivative. The product is a white solid. It is washed with successive aliquots of benzene, acetone, hexane and benzene. Drying is accomplished by warming in a vacuum oven to yield a white, elastic powder. The infrared spectrum of this polymer is consistent with polydi-(1,1-dihydroperfluoroethoxy) phosphonitrile.

Tensile samples of the polymeric product of this example are prepared in the same way as those of Example 1, Lot A being gumstock and Lot B containing 10% hexamethylenediamine. The results are as follows:

| Lot | Tensile, p.s.i. | Elongation, percent |
|---|---|---|
| A | 190 | 105 |
| B | 415 | 40 |

The Gehman $T_{10}$ for this polymer is −55° C.

*Example 5*

Poly $NPCl_2$ rubber (11.6 grams; 0.1 mole), as prepared in Example A above, is swelled in benzene and dispersed after the manner of Example 1.

2,2,3,3,4,4-hexafluoropentane-1,5-diol (2.1 grams; 0.01 mole) and 1,1-dihydroperfluorobutanol (40 grams; 0.2 mole) are each separately converted to their sodium derivatives after the manner of Example 1.

The $NPCl_2$ dispersion and the sodium derivative of the diol are stirred together in an inert atmosphere at a gentle reflux temperature for ca. 6 hours. The highly dispersed $NPCl_2$ begins to contract during this procedure. When no further contraction occurs the suspension of the sodium derivative of perfluorobutylcarbinol is added (to give a total volume of ca. 1500 ml.), and the process continued for a further 6 hours. There results a moderately coagulated solid. After filtration, this is washed repeatedly with aliquots of aqueous acetone to remove chloride. After drying at 70° C. in a vacuum oven the new polymer is recovered as a resilient powder.

*Example 6*

Poly NPCl$_2$ rubber (11.6 grams; 0.1 mole), as prepared in Example A above, is dispersed after the manner of Example 1.

ω,1,1-trihydroperfluorononanol (34.48 grams; 0.08 mole) is converted into its sodium derivative after the manner of Example 1.

The dispersed polymer and the fluoroalkoxide are reacted together after the manner of Example 2.

The product is a white, resilient solid polymer in which only about 40 percent of the chlorine atoms of the reactant polymer have been converted to fluoroalkoxy groups. This product is, however, much more stable with respect to water than is the poly NPCl$_2$ rubber starting material. It can, in fact, be immersed in water for a relatively extended period of time with essentially no adverse effects.

*Example 7*

Using the procedure of Example 1, and the molar proportions of reagents indicated therein, the following polymers are prepared from polyphosphonitrilic chloride and the sodium derivatives of the respective fluoroalcohols. There is some variation in procedure from example to example, i.e. in the washing of the product and in the solvents used to remove by-products.

| Ex. No. | Fluoroalcohol | Product | Comments |
|---|---|---|---|
| 7 | C$_2$F$_5$CH$_2$OH | White, rubbery | Excellent resistance to corrosive media. |
| 8 | C$_4$F$_9$CH$_2$OH | do | |
| 9 | C$_5$F$_{11}$CH$_2$OH | do | Do. |
| 10 | C$_6$F$_{13}$CH$_2$OH | White plastic | Do. |
| 11 | C$_7$F$_{15}$CH$_2$OH | do | Do. |
| 12 | C$_8$F$_{17}$CH$_2$OH | White waxy | Do. |
| 13 | C$_9$F$_{19}$CH$_2$OH | do | Do. |
| 14 | C$_{10}$F$_{21}$CH$_2$OH | do | Do. |
| 15 | C$_{11}$F$_{23}$CH$_2$OH | do | Do. |
| 16 | C$_{12}$F$_{25}$CH$_2$OH | do | Do. |
| 17 | C$_{13}$F$_{27}$CH$_2$OH | do | Do. |
| 18 | HC$_2$F$_6$CH$_2$OH | White rubbery | More readily swelled by water and aqueous media. Decomposed by conc. H$_2$SO$_4$. |
| 19 | HC$_2$F$_{12}$CH$_2$OH | White plastic | More readily swelled by aqueous media. |
| 20 | C$_3$F$_7$C$_3$H$_6$OH | White rubbery | Relatively less swelled by aqueous media. Good resistance to corrosive media. |
| 21 | C$_8$F$_{17}$C$_3$H$_6$OH | White waxy | Do. |
| 22 | C$_8$F$_{17}$C$_5$H$_{10}$OH | do | Do. |
| 23 | C$_8$F$_{17}$C$_{11}$H$_{22}$OH | do | Do. |

*Example 24*

Poly NPBr$_2$ (20.5 grams; 0.1 mole), similar to the rubber described in Example A above, is dispersed in benzene after the manner of Example 1.

1,1-dihydroperfluorobutanol (40 grams; 0.2 mole) is converted to its sodium derivative after the manner of Example 3.

The systems are reacted together after the manner of Example 3.

The product obtained is a resilient powder.

What is claimed is:

1. A solid, high molecular weight, vulcanizable, millable, plastic, water-stable, non-distillable, light colored phosphonitrile polymer having repeating units of the formula:

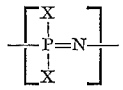

wherein each X is each selected from the class consisting of halogen and fluoroalkoxy radicals having the formula:

wherein Z is selected from the class consisting of hydrogen, fluorine and methylol, $n$ is an integer of at least 1, $m$ is an integer from 1–18 and $n$ plus $m$ is 2–19, at least 40 percent of the X groups being fluoroalkoxy radicals.

2. A polymer of claim 1 in which the X groups are selected from the class consisting of halogen and 1,1-dihydroperfluorobutoxy radicals, at least 40 percent thereof being 1,1-dihydroperfluorobutoxy radicals.

3. A polymer of claim 1 in which the X groups are selected from the class consisting of halogen and 1,1-dihydroperfluorohexoxy radicals, at least 40 percent thereof being 1,1-dihydroperfluorohexoxy radicals.

4. A polymer of claim 1 in which the X groups are selected from the class consisting of halogen and 1,1,5-trihydroperfluoropentoxy radicals, at least 40 percent thereof being 1,1,5-trihydroperfluoropentoxy radicals.

5. A polymer of claim 1 in which the X groups are selected from the class consisting of halogen and 1,1,9-trihydroperfluorononoxy radicals, at least 40 percent thereof being 1,1,9-trihydroperfluorononoxy radicals.

6. A polymer of claim 1 in which the X groups are selected from the class consisting of halogen and omega (perfluoropropyl)propanoxy radicals, at least 40 percent thereof being omega(perfluoropropyl)propanoxy radicals.

7. A polymer of claim 1 in which the X groups are selected from the class consisting of halogen and omega (perfluorooctyl)propanoxy radicals, at least 40 percent thereof being omega(perfluorooctyl)propanoxy radicals.

8. A polymer of claim 1 in which the X groups are selected from the class consisting of halogen and omega (perfluorooctyl)undecanoxy radicals, at least 40 percent thereof being omega(perfluorooctyl)undecanoxy radicals.

References Cited by the Examiner

UNITED STATES PATENTS

| 2,214,769 | 9/1940 | Lipkin | 260—2 |
| 2,681,295 | 6/1954 | Hamalainen | 260—2 |
| 2,876,247 | 3/1959 | Rätz et al. | 260—2 |
| 3,164,556 | 1/1965 | Apley et al. | 260—2 |

OTHER REFERENCES

Brown: "Journal of Polymer Science," vol. 5, No. 4, 1950, pp. 465–471.

Goldschmidt et al.: "Journal of Polymer Science," vol. 3, No. 4, 1948, pp. 481–485.

SAMUEL H. BLECH, *Primary Examiner.*